July 17, 1951 G. B. BICKELHAUPT, JR 2,561,169
AUTOMATIC DEPTH CONTROL FOR PRESSES
Filed May 21, 1948 2 Sheets-Sheet 1

Inventor
George B. Bickelhaupt Jr.
By his Attorneys
Merchant & Merchant

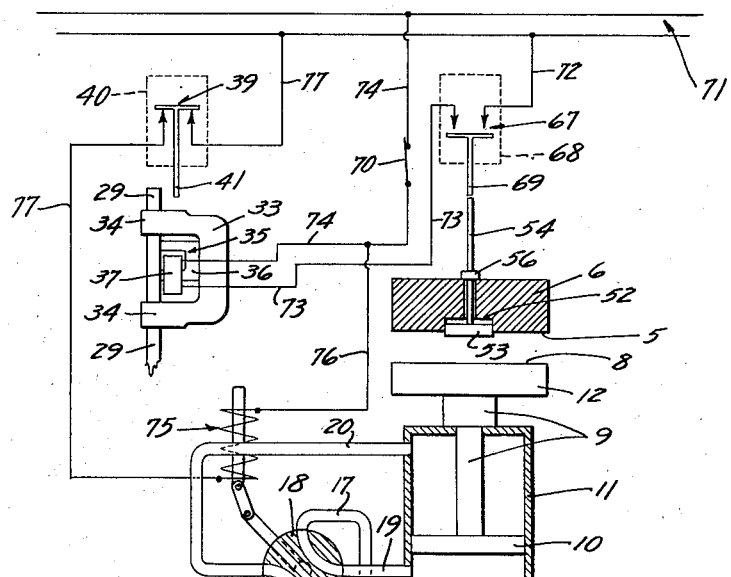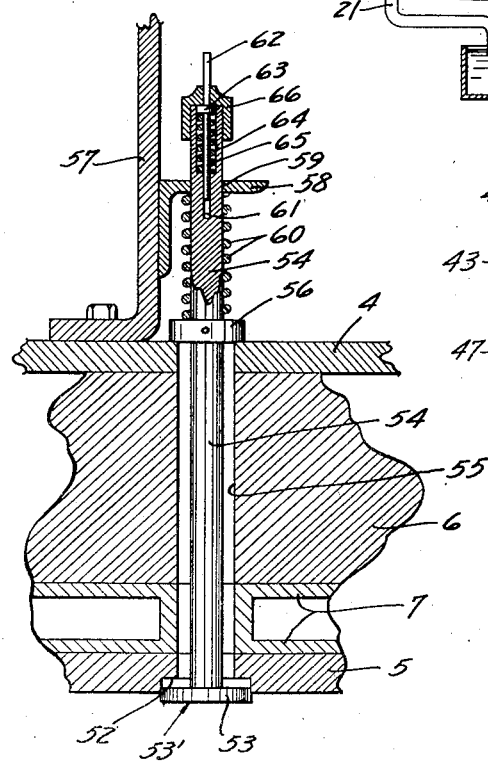

Patented July 17, 1951

2,561,169

UNITED STATES PATENT OFFICE 2,561,169

AUTOMATIC DEPTH CONTROL FOR PRESSES

George B. Bickelhaupt, Jr., Minneapolis, Minn., assignor to The Monomelt Co., Inc., Minneapolis, Minn., a corporation of Minnesota Application May 21, 1948, Serial No. 28,307

10 Claims. (Cl. 18—16)

My invention relates generally to power presses, and more specifically to automatic depth control apparatus for power presses for use in making electrotype molds from sheets of thermoplastic resins.

The conventional method of producing a molded sheet, as one step in the electrotyping process, is as follows: A printing form of conventional character is seated between relatively movable platens. This form may comprise set type, pictorial cuts, or a combination of the two. A thin sheet of thermo-plastic resin is then placed thereover, and a plurality of resilient pressure-equalizing blankets is laid upon the plastic sheet. Thereafter, this "sandwich" of blankets, form, and interposed plastic sheet is subjected to a pre-determined amount of pressure to impart the impression of the printing form onto the plastic sheet while heat is applied to the form through the platens. In some instances, the depth of the impressions transferred from the printing form to the plastic sheet is very critical, while in other instances the thickness of the resulting sheet itself is of great importance. In fact, the sheet thickness or impression depth must be held to a uniform tolerance of but a few thousandths of an inch, and, as a result, extremely accurate control of the press is essential.

A primary object of my invention is the provision of means for controlling the extent of movement of the press whereby either the depth of the impression transferred from the form to the plastic sheet or the thickness of the sheet itself may be controlled within uniform limits heretofore unattainable.

A still further object of my invention is the provision of novel means for controlling the ultimate thickness of the sheet or depth of impression responsive to pressure exerted by the platens of the press on the material being compressed therebetween.

Another object of my invention is the provision of means for adjusting the control means to vary the depth of impression or ultimate thickness of the molded plastic sheet.

A still further and highly important object of my invention in an electrically-controlled fluid pressure-operated press is the provision of a switch for operating the fluid pressure controls, an actuator for tripping said switch when the plastic sheet between the platens has been molded to proper thickness or when the proper depth of impression has been made therein, and means responsive to the pressure exerted by the platens on the material therebetween for automatically causing the actuator to engage said switch.

A still further object of my invention is the provision of a depth control device as set forth which is inexpensive to build, easy to install, and which is accurate and efficient in operation.

Other highly important objects and advantages will become apparent from the following detailed specification, appended claims, and attached drawings.

Referring to the drawings, in which like characters indicate like parts throughout the several views:

Fig. 2 is an enlarged fragmentary detail in axial section taken through a recess in one of the platens of the press of Fig. 1 and parts carried therein;

Fig. 3 is a rear elevation of one of the switches of my invention and adjusting device therefor; and Fig. 4 is a diagram illustrating the operation of my improved depth control.

Figure 1:
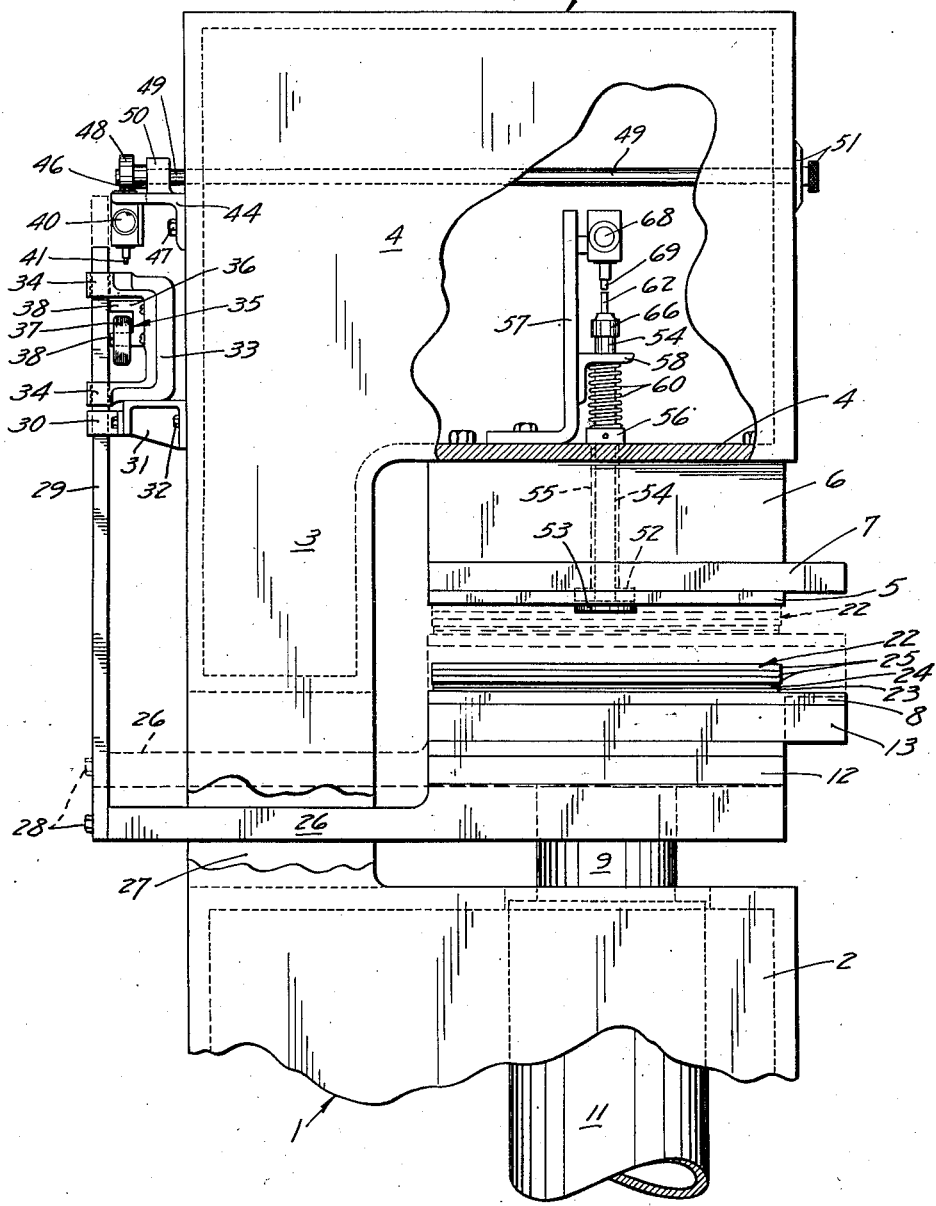
Fig. 1 is a fragmentary view in side elevation of a press with some parts broken away and some parts shown in section and showing my improved depth control molded thereon.

Referring with greater particularity to the drawings, the numeral 1 indicates in its entirety a press frame comprising a base 2, a neck 3, and a head 4 overlying the base 2. An upper stationary platen 5 is mounted to the head 4 and has interposed therebetween and the head 4 a spacer block 6 and a heater element, not shown but contained within a housing 7. A lower platen 8 underlies the fixed platen 5, and is mounted for vertical movements toward and from engagement with the platen 5 on a fluid pressure-operated piston rod 9, which is carried by a piston 10 mounted for reciprocating movements within a fluid pressure cylinder 11. Interposed between the platen 8 and the piston rod 9 are a spacer 12 and a heater element, not shown but contained within a housing 13. With reference particularly to Fig. 4, it will be seen that fluid under pressure is supplied to the interior of the cylinder 11 from a reservoir 14 by a pump 15. The pump draws fluid from the reservoir 14 through a conduit 16, and forces the fluid to one end of the cylinder through a conduit 17, a four-way valve 18, and a conduit 19. As shown, the conduit 19 connects with the cylinder 11 below the piston 10 therein. Fluid contained within the cylinder 11 above the piston 10 is adapted to flow through a conduit 20 through the valve 18 and from thence to the reservoir 14 through a conduit 21. With the valve 18 in the position shown in Fig. 4, fluid entering the cylinder 11 through the conduit 19 will move the piston 10 and the parts carried thereby, including the platen 8, in upward direction toward engagement of the platen 8 with the fixed platen 5. The valve 18 may be rotated by gravity or other means, not shown, to permit fluid to be pumped from the reservoir through the conduit 20 to the cylinder 11 above the piston 10, whereby to move the piston 19 and the parts carried thereby, including the platen 8, downwardly away from the fixed platen 5.

A "sandwich," indicated in its entirety by 22, comprises a printing form 23, a thin sheet 24 of thermo-plastic material, such as synthetic resin or the like, and a plurality of resilient pressure-equalizing blankets 25. As shown in Fig. 1, the sandwich 22 is placed upon the movable platen 8 with the printing form 23 lowermost, the sheet 24 is laid thereupon, and the blankets 25 covering the sheet 24. Upward movement of the platen 8 causes the sandwich 22 to be compressed therebetween and the fixed platen 5. At the same time, heat is applied to the sandwich 22 from the heater elements contained within the housings 7 and 13 sufficient to cause the plastic sheet 24 to be molded to the contours of the printing form, the printing form being composed of set type, pictorial cuts, or a combination of both. The extent of movement of the movable platen 8 toward the fixed platen 5 determines the depth of impression made upon the plastic sheet 24 and also the ultimate thickness of the sheet 24. As hereinbefore stated, in some instances the ultimate thickness of the molded plastic sheet 24 is of great importance in the carrying out of the electrotype process; whereas, in other instances the depth of impression in the finished plastic sheet is of prime importance. Hence, the extent of movement of the movable platen 8 toward the fixed platen 5 must be controlled to a high degree of accuracy.

I provide means for controlling the thickness of the plastic sheet 24 and the depth of impression made thereon by the form 23, irrespective of the number of blankets 25 utilized in forming the sandwich 22, now to be described. A bracket 26 mounted on the piston rod 9 extends rearwardly thereof through an opening 27 in the neck 3 of the frame 1, and has mounted fast on its outer end, by means of a bolt or the like 28, a vertically-extending arm 29. Intermediate its ends, the arm 29 passes through a guide 30 mounted fast on a bracket 31, which, in turn, is secured to the rest of the frame 1 by means of screws or the like 32. A switch actuator 33 in the nature of a C-shaped yoke normally rests upon the bracket 31 with its ends 34 slidably embracing the arm 29. An electromagnet 35 comprises a core 36 secured to the actuator 33 intermediate its ends 34 and a coil 37 wound around one leg of the core 36. It will be seen by reference to Figs. 1 and 4, that the opposite poles 38 of the magnet 35 lie closely adjacent the arm 29. The loose fit of the ends 34 of the actuator 33 on the arm 29, together with the proximity of the poles 38 thereto, cause the actuator 33 to move laterally and become frictionally locked to the arm 29 when the coil 37 of the electromagnet 35 is energized. Obviously, the arm 29, or at least the upper portion thereof, must be made of magnetically-responsive material, such as iron, steel, or the like.

Overlying the actuator 33 in spaced relation thereto is a switch 39 contained within a housing 40. The switch 39 is equipped with a depending rod 41 which is adapted to be engaged by the actuator 33 during upward movements thereof. By reference to Figs. 1 and 4, it will be seen that the switch housing 40 is secured to the intermediate portion of a leaf spring 42, which, in turn, is secured at its opposite ends to spaced legs 43 of a bracket 44 by means of bolts or the like 45 and 46. The bracket 44 is mounted fast on the rear side of the frame 1 by means of screws or the like 47. It will be noted that the bolt 46 does not clamp tightly down on one end of the leaf spring 42, but merely limits the movements thereof. The leaf spring 42 is normally in a flat condition and is adapted to be distorted as shown in Fig. 3 by means of an eccentric 48 mounted fast on a shaft 49, which extends through the head 4 of the frame 1 and is journalled in a boss 50 mounted on the bracket 44. At its end opposite the eccentric 48, the shaft 49 is provided with a calibrated turning knob 51 by which the eccentric 48 may be rotated to adjust the position of the switch 39 with respect to the actuator 33.

At its central portion, the fixed platen 5 is provided with a recess 52 and in which is adapted to be slidably movable a presser foot 53. The foot 53 forms the lower end of a plunger rod 54 which extends upwardly through a passage 55 in the fixed platen 5, the heater element housing 7, and the spacer block 6 into the interior of the head 4. Downward movement of the plunger 54 and movement of the presser foot 53 outwardly of the recess 52 is limited by a collar 56 secured to the plunger 54 and which, as shown in Figs. 1 and 2, engages the bottom wall of the head 4. An angle bracket 57 is suitably mounted to the lower wall of the head 4 and extends upwardly therein. A horizontally-disposed flange 58 fast on the bracket 57 overlies the passage 55 and is provided with an opening 59 aligned with the passage 55 and through which the upper end of the plunger 54 is adapted to slidably move. A coil compression spring 60 extending between the flange 58 and the collar 56 biases the plunger 54 and the presser foot 53 in a downward direction. It will be noted that when the presser foot 53 is raised against bias of the springs 50 to a point where it is fully retracted into the recess 52, the working face 53' of the presser foot will be flush with the fixed platen 5, for a purpose which will hereinafter become apparent.

At its upper end, the plunger 54 is provided with an axially-extending bore 61 in which is axially slidably mounted a push rod 62. Intermediate its ends, the push rod 62 is provided with a collar 63 which is of a diameter to be slidably received in a counterbore 64 in the extreme upper end of the plunger 54. A relatively flexible coil compression spring 65 is contained within the counterbore 64 and is partially compressed between the bottom of the counterbore and the collar 63. Upward spring-biased movement of the push rod 62 is limited by engagement of the collar 63 with an end cap 66 that is secured to the upper end of the plunger rod 54 and through which the upper end of the push rod 62 slidably extends. A normally-open switch 67 is contained within a housing 68 that is secured fast to the upper end portion of the angle bracket 57. The switch 67 is provided with a rod or pin 69 which overlies the push rod 62 and is adapted to be moved thereby to close the switch 67 upon upward movements of the plunger 54.

The normally-open switch 67 is contained in a circuit which includes the electromagnet 35, a manually-operated switch 70, and a source of potential such as a power line 71. It will be seen from the diagram of Fig. 4 that a lead 72 extends from one side of the power line 71 to the switch 67, a lead 73 extends from the switch 67 to the coil 37 of the electromagnet 35, and a lead 74 extends from the coil 37 to the other side of the power line 71. The manually-operated switch 70 is interposed in the lead 74 between the coil 37 and the power line 71.

Reference still being had to the diagram of Fig. 4, it will be seen that the valve 18 is controlled by a solenoid 75 and linkage therebetween and the valve 18. One end of the coil of the solenoid 75 is connected to one side of the power line 71 through a portion of the lead 74 and a lead 76. A lead 77 extends from the other end of the coil of the solenoid 75 to the other side of the power line 71. Interposed in the lead 77 is the normally-closed switch 39.

In operation, it may be assumed that the pump is being continuously driven and that the platens are being heated by the heater elements contained within the housings 7 and 13. The sandwich 22, comprising the form 23, the plastic sheet 24, and a predetermined number of blankets 25, is laid upon the movable platen 8, as indicated in Fig. 1. Manually-operated switch 70 is closed to allow fluid to be pumped from the reservoir 14 to the cylinder 11 below the piston 10, whereby to raise the platen 8 toward the fixed platen 5. The uppermost of the blankets 25, when engaging the presser foot 53, moves the plunger 54 upwardly against bias of the spring 68, whereby to cause the push rod 62 to engage the pin 69 and close the normally-open switch 67. It will be borne in mind that the arm 29 is moving upward simultaneously with the movable platen 8 and with respect to the actuator 33 which is resting upon the bracket 31 in spaced relation to the switch 39. When the switch 67 is closed, thus closing the circuit to the electromagnet coil 37, the electromagnet 35 is energized. Energization of the electromagnet 35 causes the actuator 33 to be frictionally locked to the arm 29 and moved upwardly therewith. The spring 68 may provide sufficient bias to cause the presser foot 53 to compress the blankets 25 to a lesser or greater degree before the switch 67 is closed. This condition, however, is taken into consideration when the adjustment of the calibrating knob 51 for positioning the switch 39 is made. The upward movement of the platen 8 continues until the now upwardly-moving actuator 33 opens the switch 39. Opening of the switch 39 causes the solenoid 75 to become de-energized, whereby to allow the valve 18 to cut off or reverse the flow of fluid to the cylinder 11. The valve 18 may be reversed by gravity or other means, not shown. Obviously, reversing or cutting off the flow of fluid to the cylinder 11 will instantly arrest upward movement of the movable platen 8 and resulting pressure upon the plastic sheet 24 within the sandwich 22 between the platens 8 and 5. When the movable platen 8 is returned to its full line position of Fig. 1, the sandwich may be removed from the platen 8 and another sandwich placed thereupon. It will be noted that downward movement of the platen 8 will allow the presser foot 53 to descend under bias of the spring 68 and allow the switch 67 to open, thereby de-energizing the electromagnet 35. The actuator 33 will become released from frictional locking engagement with the arm 29 and come to rest upon the bracket 31.

The switches 39 and 67 are of a type commonly known as the "microswitch" and require very little movement of the rod 41 or 69 to actuate the same. For this reason, the spring 65 is utilized in the plunger 54 to provide a strain release for the push rod 62.

My improved depth control arrangement has been thoroughly tested and found to be entirely adequate for the accomplishment of the objects set forth, and while I have shown and described a single embodiment of my invention, I do not wish to be limited by the terminology of the specification as to the spirit and scope of the invention, except as defined in the claims.

What I claim is:

1. In a device of the class described, a supporting frame including relatively fixed and movable members, cooperating platens carried one each by said members, fluid pressure-operated means for moving one of said members in the direction of the other thereof to press material between said platens, electrically-operated control valve means for said fluid pressure-operated means for arresting the movements of said movable member with respect to said fixed member, a switch associated with said fixed member for controlling said electrically-operated control valve, an arm carried by said movable member and extending outwardly therefrom in the direction of movement thereof, an actuator for said switch slidably mounted on said arm and normally biased out of operative engagement with said switch, means limiting movements of said actuator in a direction away from said switch, an electromagnet on said actuator adapted to frictionally lock said actuator to said arm for common movement therewith, an associated switch for energizing said electromagnet, and a presser foot carried by one of said platens and responsive to pre-determined pressure exerted by the platens on the material therebetween to close the switch.

2. The structure defined in claim 1 in which said controlling switch is adjustably movable with respect to said actuator whereby to vary the pressure exerted by the platens on the material therebetween.

3. In a device of the class described, a supporting frame including relatively fixed and movable members, cooperating platens carried one each by said members, fluid pressure-operated means for moving one of said members in the direction of the other thereof to press material between said platens, electrically-operated control valve means for said fluid pressure-operated means for arresting the movements of said movable member with respect to said fixed member, a switch associated with said fixed member for controlling said electrically-operated control valve, a vertically-disposed arm carried by said movable member, an actuator for said switch slidably mounted on said arm and normally gravity-biased out of operative engagement with said switch, means limiting downward movements of said actuator on said arm, an electromagnet on said actuator adapted to frictionally lock said actuator to said arm for common movement therewith, an associated switch for energizing said electromagnet, a presser foot carried by said fixed platen and responsive to pre-determined pressure exerted by the platens on the material therebetween to close said last-mentioned switch, and means for varying the position of the switch for controlling the electrically-operated means relative to said switch actuator whereby to vary the pressure exerted by said platens on the material therebetween.

4. The structure defined in claim 3 in which said last-mentioned means comprises means biasing said control switch in one direction, a cam engageable with said biasing means and rotatable in said frame to move said switch against the bias of said biasing means, and a control knob for rotating said cam.

5. The structure defined in claim 2 in which the actuator is in the nature of a yoke having its opposite ends slidably embracing said arm, and in which said electromagnet is disposed between the ends of said yoke, the opposite poles thereof being in close proximity to said arm.

6. In a device of the class described, a supporting frame including relatively fixed and movable members, cooperating platens carried one each by said members, fluid pressure-operated means for moving one of said members in the direction of the other thereof to press material between said platens, electrically-operated control valve means for said fluid pressure-operated means for arresting the movements of said movable member with respect to said fixed member, a switch associated with said fixed member for controlling said electrically-operated control valve, an arm carried by said movable member and extending outwardly therefrom in the direction of movement thereof, an actuator for said switch slidably mounted on said arm and normally biased out of operative engagement with said switch, means limiting movements of said actuator in a direction away from said switch, said platen being provided with a recess, a presser foot movable into and out of said recess and yieldingly-biased in a direction outwardly thereof, the work face of said presser foot being flush with said fixed platen when said foot is fully retracted into said recess, a plunger connected with said presser foot and working through said fixed member, a switch on said fixed member positioned in the path of travel of the plunger and adapted to be actuated thereby, electrically-operated means for frictionally locking said switch actuator to said arm, and electrical connections between said last-mentioned switch and said electrically-operated means.

7. The structure defined in claim 6 in further combination with means for varying the position of the switch for controlling the electrically-operated means relative to said switch operator, whereby to vary the pressure exerted by said platens on the material therebetween.

8. In a device of the class described, cooperating relatively movable platens, means for moving said platens towards each other to press material therebetween, means for arresting said movements of said platens, means for controlling said arresting means, an actuator for said control means normally out of operative engagement therewith, means for coupling said actuator to one of said platens and a presser foot carried by one of said platens and responsive to a pre-determined pressure exerted by said platens on the material therebetween to actuate the coupling means to couple said actuator to one of said platens whereby to cause said actuator to move into operative engagement with said control means.

9. The structure defined in claim 8 in which one of the platens is provided with a recess, and in which said presser foot is movable into and out of said recess and yieldingly biased in a direction of the other platen, the work face of said presser foot being flush with said fixed platen when said foot is retracted into said recess.

10. In a device of the class described, cooperating relatively movable platens, means for moving said platens towards and from each other to press material therebetween, means for arresting said movements of said platens, means for controlling said arresting means, an actuator for said control means, means for coupling said actuator to one of said platens and a presser foot carried by one of said platens and responsive to a pre-determined pressure exerted by said platens on the material therebetween to actuate the coupling means to couple said actuator to one of said platens whereby to cause said actuator to operate said control means.

GEORGE B. BICKELHAUPT, JR.

REFERENCES CITED

The following references are of record in the file of this patent:

UNITED STATES PATENTS

| Number | Name | Date |
|---|---|---|
| 1,435,138 | Laussucq | Nov. 7, 1922 |
| 2,062,196 | Stacy | Nov. 24, 1936 |
| 2,113,115 | MacMillin et al. | Apr. 5, 1938 |